July 27, 1937.  J. H. BAYARD  2,088,395

CALCULATING DEVICE

Filed June 19, 1934  2 Sheets—Sheet 1

Inventor
Julius Herbert Bayard
By Charles W. Hill
Attorney

July 27, 1937.  J. H. BAYARD  2,088,395
CALCULATING DEVICE
Filed June 19, 1934  2 Sheets-Sheet 2

Inventor
Julius Herbert Bayard
By Charles W. Hill
Attorney

Patented July 27, 1937

2,088,395

UNITED STATES PATENT OFFICE 2,088,395

CALCULATING DEVICE

Julius Herbert Bayard, Charleston, S. C.

Application June 19, 1934, Serial No. 731,335

6 Claims. (Cl. 235—70)

The invention relates to charts, slide rules, and the like, employed in the solving of mathematical problems, and has for an object the provision of means adapted to enable one to perform certain mathematical operations with great ease and accuracy.

It is an object of this invention to provide a helical scale intersected by a system of lines for the extraction of the roots of numbers, for the multiplying of numbers by constants, for the finding of the reciprocals of numbers or the reciprocal functions of angles, and for obtaining directly the logarithm of a number or the logarithm of a function of an angle.

Other and further objects of this invention will appear in what follows hereinafter.

A cylinder 10 is mounted for rotation on end supports 11, and is turnable by knobs 12.

Figure 1:
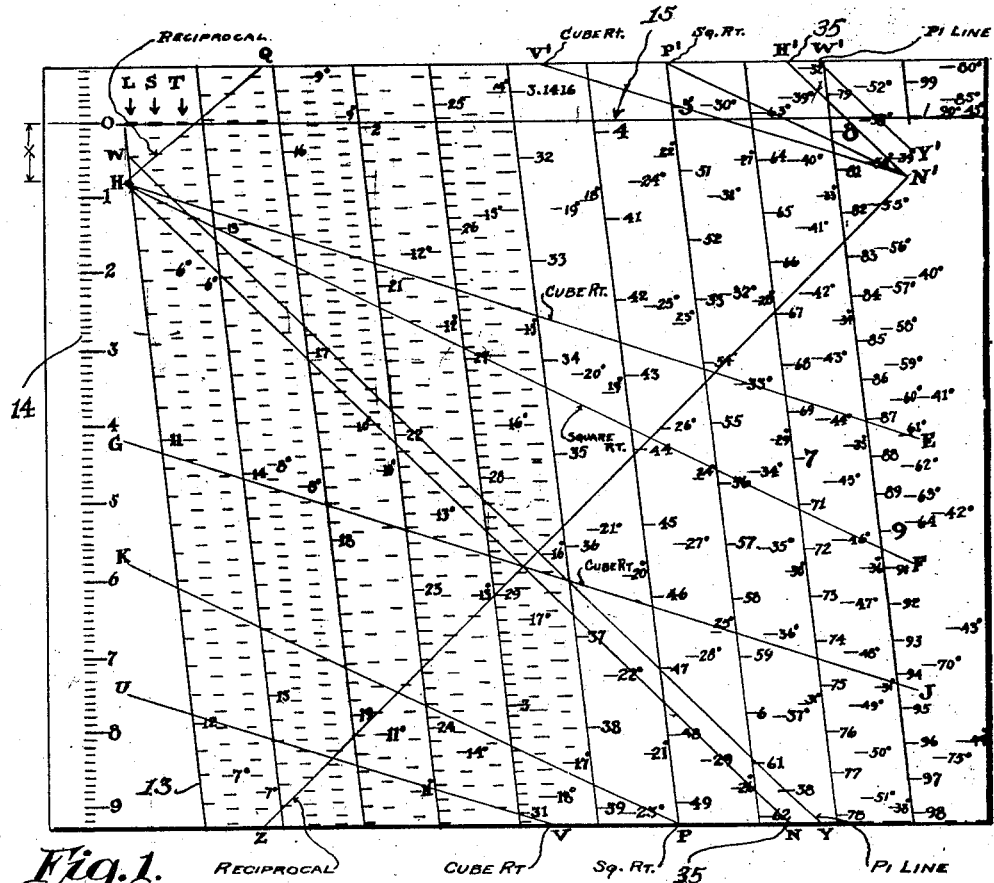
Figure 1 is a developed view of the graduated cylinder shown in Figure 3.

The cylinder 10 carries a graduated helix 13 that makes ten, or a multiple of ten, turns around the cylinder, and the turns of the spiral are intersected by a helical line HN—H'N' that makes one turn around the cylinder, as best shown in Figure 1, and is hereinafter identified by the numerals 35.

The line 35 begins at a predetermined point H, near the beginning of the helix, and on a line passing through the helix and perpendicular to the axis of the cylinder, and it ends on a line passing through the end of the helix and perpendicular to the axis of the cylinder.

A decimal scale 14 is laid off on the left end of the cylinder 10. The zero point of this scale lies in the same plane as the beginning of the helix 13, and the scale is divided into ten equal parts which are, in turn, divided into ten parts. When the helix 13 is of more than ten turns the scale 14 is also a helix, since it makes one tenth as many turns as the helix 13. Between the turns of the helix 13 there are three scales designated by the letters L, S and T, and laid off according to the logarithm of numbers, the logarithm of sines of angles, and the logarithm of tangents of angles, respectively.

Running parallel with, and in spaced relation to, the line 35 is the pi line WY—W'Y'. This pi line begins at a point on the left spaced a distance W—H from the line 35, and the distance W—H is the distance that the number 3.1416 on the logarithmic scale L is from a line 15 that passes through the origin of the helix 13. It is not necessary, of course, that the line 15 be shown on the actual rule. Other lines than the pi line may be drawn parallel with, and in spaced relation to, the line 35 to represent other constants than pi here selected.

A line H—F has the same origin as the line 35, but makes only one half turn around the cylinder. This line H—F is designated the first square root line.

A line KP—P'N' is designated the second square root line, and this line also makes only one half turn around the cylinder, terminates at the end of the line 35, and has its beginning a half turn of the cylinder from H, the origin of the line 35, and in the same plane.

A line H—E is designated the first cube root line, and, with its origin the same as that of the line 35, it makes only one third of a turn around the cylinder.

A line G—J is designated the second cube root line, and it has its origin one third of a turn of the cylinder from the point H, and in the same plane. It also makes only one third of a turn around the cylinder and ends in the same plane as the line terminals designated by N', E and F.

A line UV—V'N' is designated the third cube root line. It begins at a point two-thirds of a turn of the cylinder from the point H and in the same plane, makes one-third of a turn around the cylinder, and terminates at the same point N' as does the line 25.

A line N'Z—QH is designated the reciprocal line. It begins where the line 35 ends, makes one turn around the cylinder, towards the left, and ends at the point H.

Figure 2:
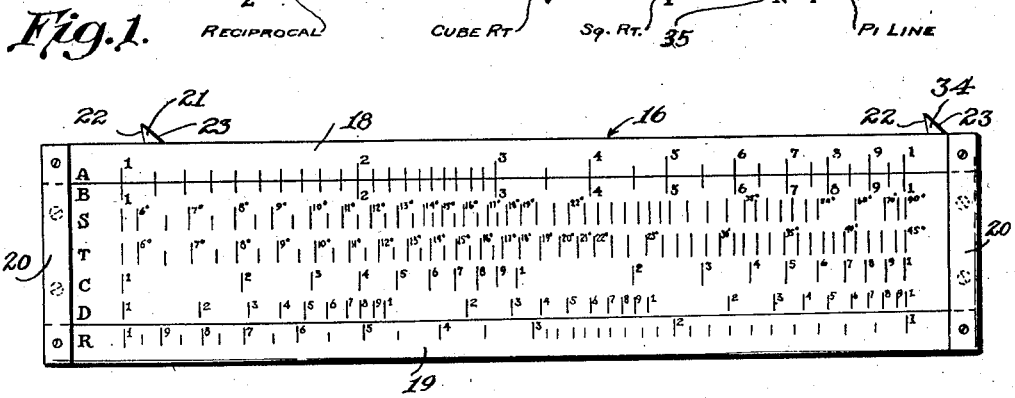
Figure 2 is a plan view of the slide rule shown in Figure 3, with parts omitted for clearness.
Figure 3:
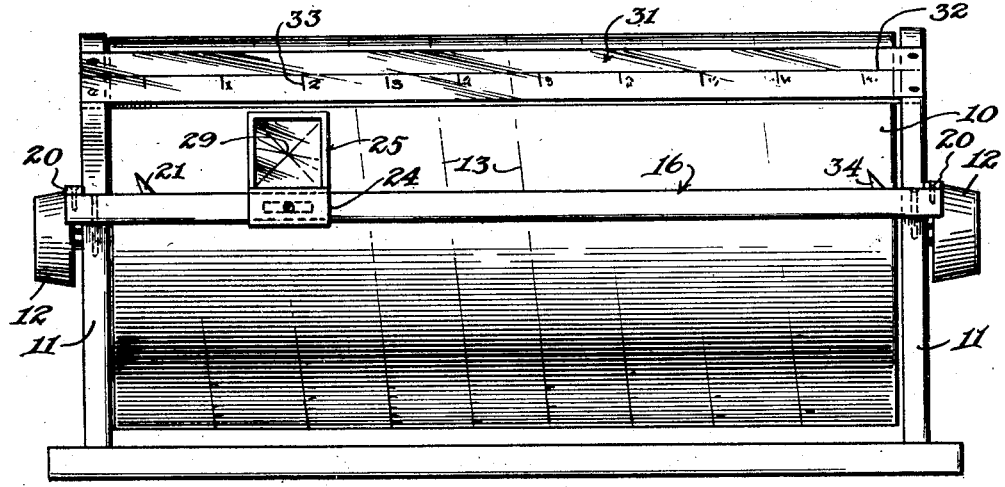
Figure 3 is a front view in elevation of the calculating device.
Figure 4:
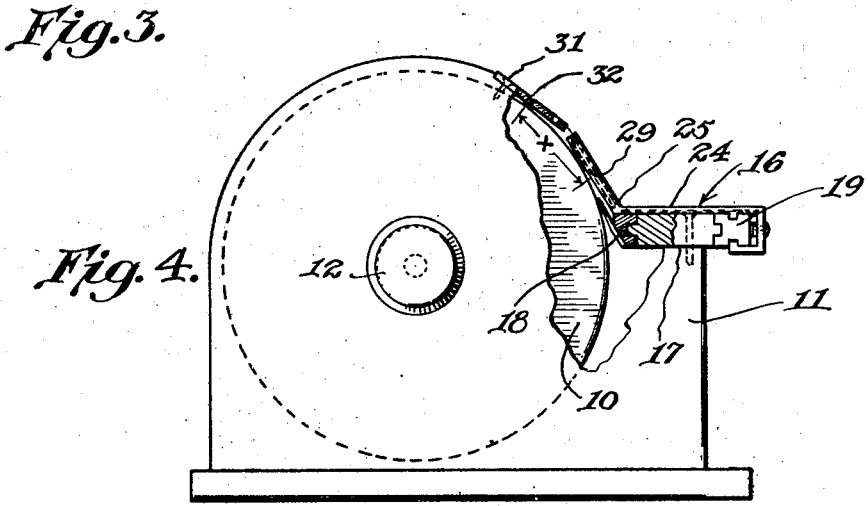
Figure 4 is an end view of the device shown in Figure 3, with parts in section and parts cut away.
Figure 5:
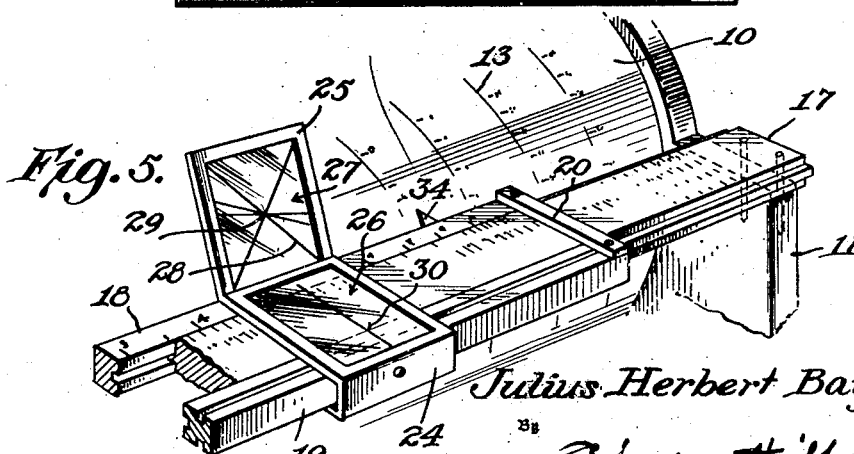
Figure 5 is a perspective view of a portion of the device shown in Figure 3.

Also mounted on the supports 11 is a slide rule indicated generally by the numerals 16. The slide rule comprises a flat stationary member 17 having tongues to cooperate with grooves in a pair of slidable side bars 18 and 19 which are secured for simultaneous movement by end connectors 20. As is best shown in Figure 2, the slide rule carries the usual slide rule scales A, B, S, T, C, D and R. The scales A and B are projections of the L scale on the cylinder 10, and if the point where any number cuts the spiral 13 on the left of the number is projected down in a plane perpendicular to the axis of the cylinder it will meet the same number on the flat slide or scale A or B. The scale S is the sine scale and is a projection of the sine scale on the cylinder. The scale T is the tangent scale and is a projection of the tangent scale on the cylinder. The scales C, D and R are the square root, cube root and reciprocal scales, respectively, and are graduated in the manner common to flat slide rules. The side bar 18 carries a pair of spaced metal pointers 21 and 34, each of which is shaped to provide a side 22 on the left parallel to the spiral 13, and on the right a side 23 parallel to the line 35.

The side bar 19 is provided with a pair of grooves to receive a tongue of a metal frame mounted slidable on the rule 16, and this frame comprises a part 24 which is horizontal, and a part 25 which extends upwardly at an angle and over a portion of the cylinder 10. The part 24 is provided with a transparent window 26 on which a bisecting hair line 30 is drawn transverse to the longitudinal axis of the rule 16, and the part 25 is provided with a transparent window 27 on which lines 28 are drawn comparable with the line 35 and other lines of the cylinder, and intersecting at a common point 29 in the center of the window.

Also mounted and secured on the end supports 11 is glass bar 31, which is provided with a longitudinally extending hair line 32, and which is graduated by slanting hair lines 33 spaced apart by a distance equal to the distance between the turns of the helix 13. When the origin of the helix 13 is under the hair line 32, then the hair lines 33 should coincide with the slanting lines of the helix 13.

The distance X between the hair line 32 on the bar 31 and the intersecting point 29 on the window 27, is, as is indicated best on Figure 1, the distance between the origin of the helix 13 and the origin of the line 35. The pointers 21 and 34 are secured in spaced relation to each other, and the distance between them is equal to the distance between the ends of the helix 13. When the origin of the spiral 13 is under the hair line 32, and the flat scales A and B coincide, the edge 22 of the pointer 21 should coincide with the first turn of the helix 13.

It will now be apparent that the drawings show a helical scale intersected by a system of lines for the extraction of roots, for multiplying by constants, for finding the reciprocals of numbers or the reciprocal function of angles, and for obtaining directly the logarithm of a number or the logarithm of a function of an angle.

One scale is used for square root, cube root and reciprocals, and since the square root and the cube root of numbers are read on the same scale as the numbers, it follows that the rule is much more accurate in use than the ordinary slide rule.

It will be obvious that the system of lines may be extended to obtain higher roots than those selected for purposes of illustration.

It will also be clear that a line may be drawn parallel to the line 35 to represent some constant other than pi, so that a number, or the square or the cube of a number may be multiplied by the constant with only one movement of the cylinder.

To make clear the use of this invention several examples of its use are given hereinafter. In the following examples the turn of the helix 13 on which the answer lies can be found by working the problem on the flat slide rule 16 and noting which turn of the helix is opposite the answer on the flat slide rule 16. The position of the decimal point, etc. in the problem is readily obtained from the slide rule in the usual way.

Multiplication of two numbers: Revolve the cylinder 10 until one of the numbers is under the hair line 32. Slide the B scale relative to the rule 16 until the A and B scales coincide. Slide the reader 25 until the point 29 coincides with the line 35. Revolve the cylinder 10 until the other factor comes under the hair line 32. Set one of the pointers so that an edge 23 coincides with the line 35. Revolve the cylinder until the line 35 coincides with the point 29. The answer now lies under the hair line 32.

It will be obvious on referring to Fig. 1, that if it is required to multiply two numbers, for instance 11 and 27, the answer can be found by adding the logarithmic distance of 11 to the logarithmic distance of 27 (in the plane of the chart), and the sum of these distances is equal to 11 times 27 or 297. However, if the logarithmic distances are projected on the helix to the line 35, and then vertically to the line 0, and are added in a line parallel to the axis of the cylinder, and their sum is projected down at right angles to the axis to intersect the line 35, the intersection is at a point in the same plane where we found the previous result, namely, 297. It is, therefore, evident that the line 35 makes it possible to add the vertical logarithmic distances by a device which slides parallel to the axis of the cylinder, or to subtract logarithmic distances in division.

Division: Revolve the cylinder 10 until the divisor comes under the hair line 32. Slide flat rule 16 so that the A and B scales coincide. Slide the reader 25 until the point 29 coincides with the line 35. Revolve the cylinder 10 until the dividend is under the hair line 32. Slide the flat scale 18—19 with reader 24—25 until the point 29 coincides with the line 35. Revolve the cylinder 10 until the line 35 coincides with an edge 23 of one of the pointers. The answer now lies under the hair line 32.

To multiply a number by pi: Revolve the cylinder 10 until the number is under the hair line 32. Slide the reader 25 until the point 29 coincides with the line 35. Revolve the cylinder until the pi line coincides with the point 29. The answer now lies under the hair line 32.

If the distance any number is from the line 15 is added to that of any other number we will have multiplied these numbers. It will be evident, then, that if any number is projected parallel to the line 15, then to the line 35, and then to the pi line, we will have a point that lies in a line passing through the product of the number and pi. Thus, if we would multiply 9 by pi, we project 9 parallel to the line 15 until it intersects the line 35, and project vertically to the pi line. The answer, 282, is found on the 9 plus 5, or fourth turn, of the helix, for while 9 plus 5 equals 14 only the last figure is used.

To multiply the square of a number by pi: Revolve the cylinder 10 until the number appears under the hair line 32. Slide the reader 25 until the point 29 coincides with the square root line under the hair line 32. Revolve the cylinder 10 until the pi line coincides with the point 29. The answer now lies under the hair line 32.

Logarithm of numbers and logarithm of the functions of angles: Revolve the cylinder 10 until the number or the function of angle is under the hair line 32. The first digit of the logarithm is found from the numbers 33 on the glass bar 31. The number which is to the left of the turn of spiral 13 in which the number or the function lies, is the first digit. The remaining digits are read under the hair line 32 on the scale 14.

It will be obvious that if alongside the scale L there was placed another scale divided into ten parts and with each of these ten parts sub-divided into ten parts it would be possible to read the mantissas of common logarithms from the now decimal scale. The similarly numbered divisions of the decimal scale are all parallel to the base of the chart if a flat chart is used. It is therefore possible to substitute a scale one tenth as long as the aforementioned suggested decimal scale; and on the end of the chart (scale 14) if the divisions 1/10, 2/10, etc. are left in their respective places, or are placed on the transparent bar 31. Thus, to find the logarithm of 2: Observe the first digit on bar 31 to the left of the turn of the helix on which the number 2 lies, and this is found to be 3. On scale 14 we read the remaining digits, namely, 01, plus. The logarithm of 2 is 301 plus.

It will be obvious that if the scale L is any multiple of ten turns that the scale 14 will be still proper if it has one tenth as many turns as scale L.

To square a number: Revolve the cylinder 10 until the number is under the hair line 32. Slide the reader 25 until the point 29 coincides with a square root line. Revolve the cylinder 10 until the line 35 coincides with the point 29. The answer now lies under the hair line 32.

Square root of a number: Revolve the cylinder 10 until the number is under the hair line 32. Slide the reader 25 until the line 35 coincides with the point 29. Revolve the cylinder 10 until a turn of the spiral 13 is approximately opposite the square root of the number on the flat scale 17. This will cause one of the square root lines to lie near the point 29. Revolve the cylinder until this square root line coincides with the point 29. The answer now lies under the hair line 32.

If a logarithm scale is laid on in a straight line, it is possible to take the square root of any number between 1 and 10 by using a pair of dividers and bisecting the distance that the number is from the beginning of the scale, so long as the number of digits in front of the decimal is odd.

Now since adding distances on a logarithm scale is multiplication, it is possible to take the square root of any number by adding the square root of ten to the square root of any number of an odd number of digits and get the square root of the number with an even number of digits.

It is possible therefore to take the square root of ten by bisecting the total length of the scale L of ten turns. But since there are an even number of turns the square root of 10 must lie in the same plane parallel to the axis as the number 10. In Figure 1, where the line 15 cuts the fifth turn of the helix 13 is the square root of 10. The square root of a number, with an even number of places must lie in the same planes as this number with an odd number of places, since if we add the square root of ten to a number we do not change the plane in which the number is because the square root of ten is a whole number of turns. In Figure 1, it will be noted that the square root of 9 and the square root of 90 lie in the same plane.

With the line 35 and the square root lines it is possible to bisect the distance that any point on the helix 13 is from the line 15, which line is a distance O—H above the point H.

In the manipulation of the rule the operation is that of adding the distance O—H to the number and projecting to the line 35. If the number lies on an even turn of the helix, project to the square root line H—F and subtract the distance O—H. If the number lies on an odd turn of the helix, project to the square root line K P P'N' and subtract O—H. If the number has an odd number of digits the turn of the helix on which the square root lies is one half of that on which the number lies. If the number has an even number of digits the square root lies on the turn of the helix that is one half that which the number is on plus 5. The square root of 90 lies on the 4 plus 5 or ninth turn of the helix.

Thus, to take the square root of 9, we add the distance O—H to 9 on the L scale, project parallel to line 15 to the line 35, at the intersection project vertically to line K. P., and from this intersection subtract the distance O—H. The square root of 9 lies in a plane passing through this point parallel to line 15.

The turn of the helix on which the square root lies is found by dividing the turn of the helix on which 9 lies by 2, disregarding the fraction, giving 4, and the square root of 9 lies on the fourth turn of the helix.

It will be noted that the line 32 is a distance O—H from the point 29.

When the chart is laid out flat, it will be apparent that to get the square root of any number we must add the distance O—H to the number before projecting to the line 35, and subtract this distance after we have projected to the square root line.

Cube root of a number: Revolve the cylinder 10 until the number is under the hair line 32. Slide the reader 25 until the line 35 coincides with the point 29. Revolve the cylinder until a turn of the spiral 13 is approximately opposite the cube root of the number on the flat scale 17. This will cause one of the cube root lines to lie near the point 29. Revolve the cylinder until this cube root line coincides with the point 29. The answer now lies under the hair line 32.

Cube root: The cube root of any number that has 1 plus 3N digits (where N may be 0 or any whole digit) in front of the decimal point always lies between 1 and the cube root of 10. This can be seen by looking at the cube root scale on any flat slide rule. If the number has 2 plus 3N digits, the cube root of the number is always found between the cube root of ten and twice the cube root of ten. If the number has 3 plus 3N digits the cube root is found between $$2\sqrt[3]{10} \text{ and } 10$$

Now, with the helical scale it is evident that the cube root of 10 lies on the third turn of the helix, 1/3 turn of the helix from the line 15. Call this point A. Likewise the cube root of 100 is found on the 6th turn of the helix 2/3 turn of the helix from the line 15. Call this point B. Also the cube root of 1000 is found on the 9th turn of the helix 3/3 turn of the helix from the line 15. Call this point C. Now the cube root of any number of 1 plus 3N digits lies between the beginning of the rule and the point A. The cube root of any number of 2 plus 3N digits lies between the points A and B. The cube root of any number of 3 plus 3N digits lies between the points B and C. We will now consider the distances between these points as independent scales, with the beginning at the points 1, A and B. Since the distance O—H is subtracted when the rule is assembled it is evident that the point 1 is the beginning of the first cube root line HE.

General rules for taking cube root are as follows: First example: We will consider a number with 1 plus 3N digits. This means that the cube root will lie between 1 and the point A. Divide the turn of the helix on which the number lies by 3. The quotient is the turn of the helix on which the cube root of a number lies. Project the number to the line 35, and then vertically to the cube root line that has the same number as the remainder of the division of the turn of the helix by 3. *Example:*—Find the cube root of 9: As 9 lies on the 9th turn of the helix we divide 9 by 3 which equals 3 with no remainder. Therefore the cube root of 9 lies on the third turn of the helix. Now we add OH to 9 and project parallel to line 15 and to the line 35, then vertically to the first cube root line (first cube root line since there is no remainder) and subtract OH. We now have a point that lies in the same plane as the cube root of 9. The cube root of 9 is read on the 3rd turn of the helix.

*Second example:*—Find the cube root of 90. Now 90 has 2 plus 3N digits, so the cube root scale starts at the point A. Therefore to take the cube root of 90, we proceed the same as for 9, but instead of projecting to the first cube root line, we project to line 2. Also since A is on the third turn of the helix, we find the cube root of 90 on the 9/3 plus 3 or 6th turn of the helix.

*Third example:*—Find the cube root of 900. As 900 has 3 plus 3N digits, we will project to line 3. Also the cube root of 900 is read on the 9/3 plus 6 or 9th turn of the helix.

*Fourth example:*—Find the cube root of 6. The number 6 lies on the 7th turn of the helix. Therefore the cube root of 6 lies on the 7/3 or 2nd turn of the helix. Since 6 has 1 plus 3N digits, as far as the number of digits are concerned, we use line one, but since 7/3 has a remainder of 1 we must use 1 plus 1 or 2nd cube root line. Therefore to find the cube root of 6 add OH to 6, project to line 35, then to the 2nd cube root line, subtract OH, read answer on 2nd turn of the helix.

Cube root of 60. Number of digits, 2 plus 3N equals line No. 2. Remainder of 7/3 equals one, 2 plus 1 equals 3, project to line 3 and read answer on 3 plus 7/3 or 5th turn of the helix.

Cube root of 600. Number of digits, 3 plus 3N, equals line 3. Remainder 7/3 equals 1. 3 plus 1 equals 4. Line four is equivalent to line 1, but 1 must be added to the turn of the helix on which the answer is to be found on. Read answer on 6 plus 7/3 plus 1 equals 9th turn of the helix. Project 6 of the line 35, then to the first cube root line, and read answer on the 9th turn of the helix.

By using the flat slide rule in conjunction with the cylinder the addition of turns of the helix is avoided. Parts 18, 19, are slid until one on the R scale is opposite the number of the D scale of which we wish to take the cube root (using scale D like the cube root scale on any flat slide rule). Then place the number of which we wish to take the cube root on the cylinder under the hair line 32. Place the hair line 28 over the line 35. Revolve the cylinder until the spiral coincides with one of the pointers 21 or 34. This will cause one of the cube root lines to lie near the point 29 (if it were possible to set the slide and cursor with infinite accuracy, the point 29 would coincide exactly with a cube root line, but there is no need to set the flat slide rule so very close as it is only being used as an index). If this cube root line is placed under the point 29, the cube root of the number will be found under the hair line 32 on the turn of the spiral opposite the index 21 or 34.

The above method can be applied to square root also if desired.

Reciprocal of a number: Revolve the cylinder 10 until the number is under the hair line 32. Slide the reader 25 until the line 35 coincides with the point 29. Revolve the cylinder until the reciprocal line coincides with the point 29. The answer now lies under the hair line 32.

In the above operation we add the distance O—H to the number, and project the total distance parallel to the line 15 until we intersect line 35. We then project the point of intersection vertically until we intersect the reciprocal line. Then we subtract O—H, and this gives the plane in which the reciprocal of the number lies. The turn of the helix on which the answer lies is found by subtracting the turn of the helix on which the number lies from the number of turns of the helix on the rule, ten in the present case.

What I claim is:

1. In a calculating device, a cylindrical chart having a first helix of ten turns thereon graduated according to the logarithm of numbers, and having a second helix of a single turn extending along the chart and intersecting each of said ten turns.

2. In a calculating device, a cylindrical chart having a first helix of ten turns thereon graduated according to the logarithm of numbers, a second helix of a single turn extending along the chart and intersecting each of said ten turns, and a third helix of a single turn extending along the chart and intersecting each of said ten turns, said third helix being disposed in spaced parallel relation to said second helix.

3. In a calculating device, a cylindrical chart having a first helix of ten turns thereon graduated according to the logarithm of numbers, a second helix of a single turn extending along the chart and intersecting each of said ten turns, and a third helix of a fractional part of a turn extending along the chart and intersecting each of said ten turns.

4. A calculating device comprising a support, a cylinder mounted rotatable on said support and having a first helical line of ten turns thereon graduated according to the logarithm of numbers, and having a second helical line thereon of a single turn extending along said cylinder and intersecting each of said ten turns, and having a third helical line thereon of a fractional part of a turn extending along the cylinder and intersecting each of said ten turns, means cooperable with said first, second and third helical lines in the solving of mathematical problems, said means comprising a graduated bar on said support and extending parallel to the longitudinal axis of said cylinder, said bar having graduations comparable to the number of turns of said first helical line, a movable reader on said support, said movable reader comprising a transparent member having a plurality of lines thereon crossing at a common point, said lines being complementary to portions of said first, second and third helical lines, a slide rule on said support provided with conventional logarithmic scales and a pair of spaced pointers, and a member slidable on said rule and movable with said reader and provided with an indicator cooperable with the line-crossing point on said reader.

5. A calculating device comprising a support, a cylinder mounted rotatable on said support and having a first helical line of ten turns thereon graduated according to the logarithm of numbers, and having a second helical line thereon of a single turn extending along the cylinder and intersecting each of said ten turns, said second helical line having its origin at a point on said cylinder spaced a predetermined circumferential distance from the origin of said first helical line, a graduated bar on said support and overlying said cylinder and having means defining a line extending parallel to the axis of said cylinder, a movable reader on said support and overlying said cylinder, said reader having a plurality of lines thereon crossing at a point and complementary to portions of said first and second helical lines, said bar and said reader being arranged so that the distance between said line on said bar and said point of crossing equals the circumferential distance between the origins of said first helical line and said second helical line, respectively, a slide rule on said support provided with conventional logarithmic scales and with a pair of spaced pointers, and a member slidable on said slide rule and movable with said reader and provided with an indicator cooperable with the line-crossing point on said reader.

6. A calculating device comprising a cylinder having a first helical line of ten turns thereon graduated according to the logarithm of numbers, and having a second helical line thereon of a single turn extending along said cylinder and intersecting each of said ten turns, and having a third helical line thereon of a fractional part of a turn extending along said cylinder and intersecting each of said ten turns, a support for said cylinder, and means on said support cooperable with said helical lines on said cylinder in the solving of mathematical problems.

JULIUS HERBERT BAYARD.